Figure 1:
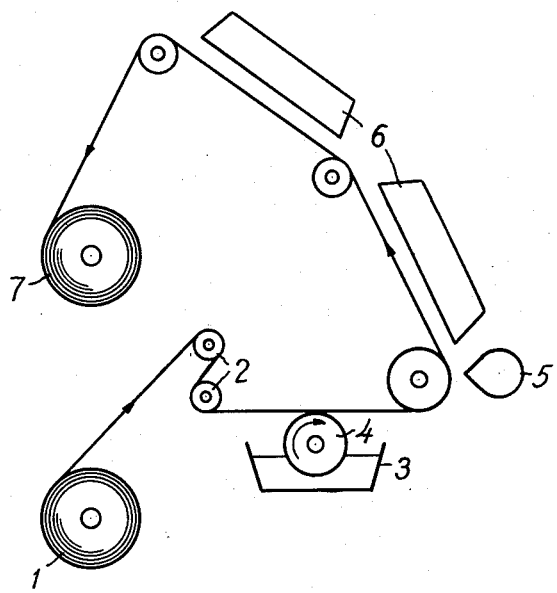

INVENTOR.
LENNART PIHL 3,132,041
MOISTURE RESISTANT WRAPPING MATERIAL WITH MULTIPLE COATINGS OF VINYL POLYMER AND RUBBER LATEX
Lennart Pihl, Solna, Sweden, assignor to AB Bonnierforetagen, Stockholm, Sweden, a corporation of Sweden
Filed Jan. 16, 1961, Ser. No. 82,897
Claims priority, application Sweden Nov. 21, 1960
9 Claims. (Cl. 117—76)

The present invention relates to a bonding agent of the type which when applied in the form of a layer on a carrier gives good bonding (cohesion) only on surfaces of substantially the same material as the carrier but insignificant bonding (adhesion) on surfaces of different material.

The invention also relates to wrapping material which, on at least one side, is provided with a layer of such a bonding agent. It was previously known that such a layer, which on account of its above mentioned characteristics is called cohesive, may be made of synthetic or natural rubber latices, which are modified by a water soluble starch colloid or casein colloid. A layer of these materials is not particularly water or moisture resistant. Of course layers of synthetic or natural rubber latices are to a certain extent water resistant but this characteristic is reduced when such a latex is modified by water soluble colloids for the purpose of adjusting the cohesive properties.

It has previously been proposed to produce a moisture resistant—that is a water vapour resistant—wrapping material which on one side has a cohesive layer by applying on the other side a moisture resistant layer, for example of wax, plastic or the like. The wax layer cannot be applied to same side as the cohesive layer owing to the different physical properties of wax and latex; and it has not been possible to obtain sufficient bonding of the cohesive layers on plastic layers. Wrapping material with such layers are described for example in U.S. specifications 2,529,060 and 2,704,732.

Wrapping material of this known kind is not however particularly cheap to produce and it has also certain disadvantages. The latter applies particularly to wrapping material on which it is desired to print, for example after the wrapping material has been manufactured (e.g. bag) because printing cannot be effected on a waxed surface and it gives rise to difficulties on plastic surfaces.

An object of the invention is to produce a bonding agent and a wrapping material provided with this bonding agent, which in these respects is superior to the above mentioned known material and in which there is a plastic film under the cohesive layer. Another object of the invention is to render it possible to modify the cohesive material in such a way that a wrapping with a layer of such a material can also be sealed, that is closed in such a way that it cannot be opened without harming the base material. The invention also contemplates such a modification of the cohesive substance that its cohesive qualities are strengthened while its adhesive qualities, that is its ability to bond surfaces of different materials is weakened.

The bonding agent according to the invention is mainly characterized in that it contains one or more components consisting of natural rubber latex or synthetic latices and one or more components consisting of natural resin or synthetic resin from the group of vinylpolymers, for example polyvinylidene chloride, polyvinyl chloride, polyvinyl acetate, polyvinyl chloride acetate and the like, and copolymers thereof.

The component or the components of natural resin or artificial resin may be added in the form of an emulsion or dispersion, in which water can constitute the dispersion medium.

Surprisingly a layer of such a material according to the invention when applied to a base material can be completely water resistant while retaining its cohesive qualities so that the base material, for example paper with vinyl plastic, for example Saran coated paper, or cellophane can be used for packing of good containing water. The cohesive properties of the layer do not disappear in a water bath; a wrapping of such material according to the invention can therefore be sealed under water, which is a great advantage particularly in such cases where the packing contains a substance containing water, for example liquid food stuffs. In the latter case it is also an advantage to be able to seal the wrapping without the application of heat.

Wrappings of previously known types have required sealing by the use of both pressure and heat (heat-sealing); the heat required has been so high that it rendered wrapping of temperature sensitive goods, for example ice-cream and chocolate, difficult.

Films made of mixtures based on, for example, polyvinylidene chloride dispersions and natural rubber latex have relatively low water vapour penetration values of approximately 5–30 grams/m.$^2$ per 24 hours when there is a 65% difference in relative humidity at a temperature of 20° C. Practical storage tests have however shown that it is desirable to reduce the water vapour penetration value even lower, for example to a maximum of 1–2 grams/m.$^2$ per 24 hours. This can be achieved by the invention, namely by applying a thin film of polyvinylidene chloride alone under a film based on a mixture of plastic dispersion and natural rubber latex; the polyvinylidene chloride permits very little water vapour to penetrate it. Since the wrapping material during its manufacture is formed in several steps it is possible to obtain a water vapour penetration value lower than 1 gram/m.$^2$ per 24 hours. By means of suitable mixing of the components in the various layers it is possible to obtain complete bonding of the various films to each other so that when pressure sealing is used strong and well sealed wrappings are obtained.

By modification of the composition of the bonding agent according to the invention it is possible to achieve an increase in the cohesive properties of the synthetic or natural rubber latex and a reduction in its adhesive qualities so that the desired selective bonding is obtained together with the bonding to an underlying plastic layer. The component or components which consist of natural rubber latex or synthetic latices may of course in known manner be modified by a water soluble colloid, for example a starch or casein colloid, but this is not necessary since the component of natural resin or synthetic resin from the group of vinyl polymers just mentioned has also as mentioned above the effect that the above mentioned synthetic or natural rubber latex along or in mixture can be given suitable cohesive qualities.

An addition of a plasticizer, such as esters of adipates, phthalates etc. in an emulsion to the natural rubber latex and plastic dispersion greatly increases the cohesive qualities of the cohesive layer; this effects the strength of the seal and the speed at which the seal may be effected. When the wrapping material is intended for groceries the material used must be such as are approved for contact with groceries.

Such latices or plastic products modified by synthetic resins (plastic dispersion) in an aqueous form are normally applied by paper coating machines in which the dispersion is applied to the paper by means of a smooth roll which extends into the dispersion and transfers an excess of the dispersion onto the paper. The coated paper is moved into the machine and dried either by means of infra red or hot air. It is known to form a plastic film in several steps so that the first applied plastic dispersion dries to form a film and thereafter a new film is applied. In this way it is possible to modify the qualities of the layer. According to the invention it is now possible by modification to apply the above mentioned cohesive latices on top of the plastic films. According to the invention a polyvinylidene chloride dispersion may be first applied and dried, and then, in a following step, a mixture of polyvinylidene chloride dispersion, and a natural rubber latex containing an antioxidant, dispersion and wetting agent may be applied. In a further third step, if desired, a pure natural rubber latex or mixture of natural rubber latex and polyvinylidene chloride dispersion, for example, may be applied in order to adjust the cohesive qualities. Such a wrapping material produced according to the invention has a very low water vapour penetration value and requires only pressure without heat for sealing. At the same time as a good seal is obtained the plastic layers are well bonded to each other by a stepwise application. In each layer one of the components is in a mixture containing natural rubber latex in a selected mixing ratio. Manufacture in this manner may, in addition to paper, be effected on laminates of paper and aluminum foil or on pure plastic sheets which adhere to the applied modified plastic dispersion in aqueous phase. It is no restriction in the invention if the application is made on paper and the paper in subsequent step is combined with other material for example by lamination. It should be observed that it is also not necessary to carry out the various steps one immediately one after another; the paper can be rolled up between each step or be moved directly through a multi-stage coating machine.

Figure 2:
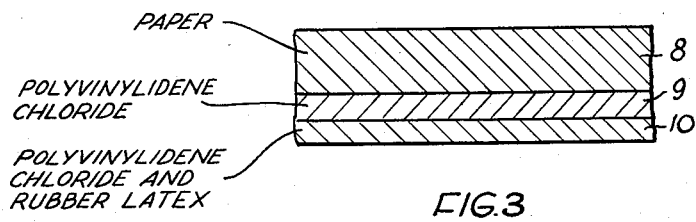
Figure 3:
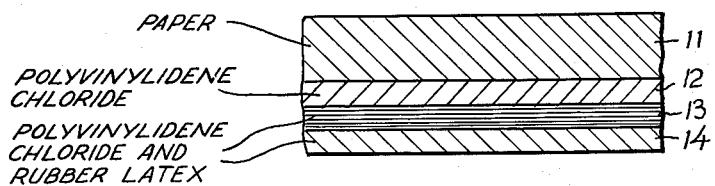

An apparatus for producing wrapping material according to the invention is described below, together with several embodiments of wrappings, with reference to the accompanying drawings in which FIGURE 1 is a diagrammatic representation of a suitable apparatus. FIG. 2 is a section through one embodiment of wrapping material and FIG. 3 is another embodiment.

In the coating apparatus shown in FIG. 1 the base material, for example paper, is rolled from a supply roll 1, moves over guide rollers 2 and then passes in a horizontal position over a bath 3. The bath 3 contains coating material, and a transfer roll 4 extends into the bath. The paper is held pressed against the roll 4 so that an excess of coating material is applied to the underside of the paper. The paper then passes in front of a slot-shaped mouth piece 5 through which compressed air is blown onto the paper; this removes surplus coating material and distributes the latter evenly over the paper. The paper is then moved upwardly at an inclined angle past two infra red heaters 6 and is finally rolled up in a dry condition in a roller 7. This apparatus can also be so constructed that the coating is effected in several steps; after the first drying devices there are one or more coating members with succeeding drying devices.

The wrapping material shown in section in FIG. 2 consists of a base material 8, for example paper, on which there is a thin layer 9 of polyvinylidene chloride and on top of the latter a further thin layer 10 consisting of a mixture of polyvinylidene chloride and natural rubber latex. The wrapping material shown in FIG. 3 consists of a base material 11, for example paper, a thin layer 12 consisting of polyvinylidene chloride and a thin layer 13 consisting of a mixture of equal parts of polyvinylidene chloride and natural rubber latex, and thin top layer 14 of a mixture of 5% of polyvinylidene chloride and 95% natural rubber latex.

Several examples of wrapping material according to the invention are given below.

*Example 1*

A 60 grams/m.$^2$ bleached smooth kraft paper is coated in a coating apparatus with a plastic dispersion in the following manner. The paper is moved over the coating unit in which 5–25 grams/m.$^2$ of a 50% water dispersion of polyvinylidene chloride, for example the type Diofan 230 from BASF, is applied; the dispersion is then dried by infra red device. After the dispersion has dried, 5–8 grams/m.$^2$ of a mixture of equal parts of a 50% aqueous dispersion of polyvinylidene chloride and 60% natural rubber latex containing smaller quantities (1% of liquid weight) of sodium alkyl sulphonate as a dispersion and wetting agent. After the application the layer is dried, and a third coating of 5–8 grams/m.$^2$ of a mixture of 80 parts 60% natural rubber latex and 20 parts 50% aqueous dispersion of polyvinylidene chloride containing the above mentioned wetting agents is applied. A further layer can be applied in a fourth step if it is desired for example, to increase the strength of the bond; this layer is a thin coating of natural rubber latex stabilized by casein and containing anti-oxidant, for example butyl hydroxyltuol (BHT) in a quantity of 2 percent by weight of the natural rubber latex. The application in the fourth step can be effected in the same manner as in the previous three steps. The paper can be rolled up without any jamming or adhesion in the roll, and the applied layer has good water moisture sealing properties and can only adhere to itself (cohesive bond).

*Example 2*

A paper as coated in the first step with 5–25 grams/m.$^2$ with a 50% aqueous dispersion of polyvinylidene chloride and is dried thereafter. In the succeeding step there is applied 5–8 grams/m.$^2$ of a mixture of equal parts of 50% aqueous dispersion of polyvinylidene chloride and 60% natural rubber latex containing 2% of sodium alkyl sulfonate as wetting agent. In a third step a mixture of 95% of a 60% natural rubber latex mixed with 10%–20% BHT emulsion and 5% of a 50% aqueous dispersion of polyvinylidene chloride is applied. In this way a coated paper with smaller total quantity of plastic is obtained.

*Example 3*

A mixture of 65% by volume of a 60% natural rubber latex and 35% by volume of a 40% aqueous dispersion of polyvinylidene chloride is prepared and is applied in a quantity of 5–25 grams/m.$^2$ in liquid form to a paper base material. After the applied layer has dried it has cohesive qualities (selective adhesion) and is also moisture resistant. A wrapping material of this kind can advantageously be used for wrapping certain groceries, cigarettes and other moisture sensitive articles etc.

The bonding agent produced according to the example applied on one side of the sulphite paper in a quantity of 40 grams/m.$^2$ has a water vapour penetration of 5 grams/m.$^2$ per 24 hours when there is a difference in relative humidity of 45% in the air on both sides of the paper. This figure meets the requirements of water vapour resistance for a wrapping material for e.g. cigarettes or the like.

*Example 4*

A mixture of 80% by volume of 60% natural rubber latex and 20% by volume of 50% of a water dispersion of polyvinylidene chloride is prepared and is applied in a quantity of 5–25 grams/m.$^2$ on the base material. After drying the applied layer has cohesive qualities. The cohesive bond is however, in contra distinction to the case in Example 3, above irreversible, that is a wrapping of this material is sealed in such a way that it cannot again be open without destroying the base material, which in some cases may be desirable for example for certain unit packages (spices, tea and the like).

Depending on the type of latex plastic dispersion mixture which is used it is possible to obtain a bond by means of the bonding agent according to the invention which is either reversible or irreversible; this is achieved in the former case by using a larger and in the latter case by using a smaller addition of natural or synthetic resin.

The wrapping material according to the invention can also be used to protect goods, for example groceries, against biological damage by organisms of the type thallus, for example bacteria, fungi and the like. For this purpose according to the invention fungicidal or bactericidal substances are added to the bonding agent or to the base material or to both. Examples of fungicidal substances are paraoxy-benzoic acid. Para-nitro-benzoic acid and/or esters of these, dihydro acetic acid, diphenyl, ortho phenyl phenol and terpineol which can be used individually or in a combination with each other. Examples of bactericidal substances are paranitrobenzoic acid terramycin, amomycin, penicillin, and/or their esters, antibiotics of the streptomycin type and/or their esters which may be used individually or in combination with each other. An example of the wrapping material with the fungicidal action is given below.

*Example 5*

A paper made of bleached sulphate pulp having a weight of 40 grams/m.² is used as a base material, and it is coated with a quantity of 5–25 grams/m.². The first layer consists of a mixture of equal part of a 50% aqueous dispersion of polyvinylidene chloride and a 60% natural rubber latex containing 2% sodium alkyl sulphonate as wetting agent. A bonding agent is introduced into a second layer which comprises a 25% ammonia stabilized natural rubber latex to which has been added 5 percent solution of a carboxy methylcellulose solution and glycerine and an aqueous emulsion of diphenyl according to the following:

|   | Percent by volume |
|---|---|
| Latex | 65 |
| Carboxymethylcellulose | 20 |
| Glycerine | 10 |
| Diphenyl emulsion | 5 |

Contrary to what would have been expected the bonding agent does not prevent the action of the fungicidal agent, which therefore acts on the contents of the wrapping to protect it from fungicidal attack.

It is also possible by means of the wrapping material according to the invention to protect metals against corrosion, for example iron and steel from rust, by including a corrosion preventing or corrosion reducing agent in the base material and/or the bonding agent. Such chemical inhibitors operate, for example, in such a way that they surround the wrapped material with their vapour phase, which in this way inhibits corrosion. Certain organic nitrites, for example dicyclohexylamine nitrite, are examples of such substances which are known under the name VPI (vapour phase inhibitors). An even more effective compound is cyclohexyl amino carbonate. An example of a wrapping material according to the invention suitable for wrapping of iron products, steel or the like is the following.

*Example 6*

A base material which comprises a paper made from bleached kraft pulp having a weight of 50 grams/m.² is coated with a first layer in a quantity of 5–25 grams/m.². The layer consists of a mixture of equal parts of a 50% aqueous dispersion of polyvinylidene chloride and 60% natural rubber latex containing 2% sodium alkyl sulphonate as wetting agent. A second layer of a self adhesive bonding agent containing 60% ammonia stabilized natural rubber latex containing a 20% casein solution and glycerin is applied. In the self-adhesive layer a corrosion inhibiting substance is included; in this case it comprises a 50% aqueous solution of cyclohexyl amino carbonate.

The proportions used are given in the following example:

|   | Percent by volume |
|---|---|
| Latex | 50 |
| Casein solution | 20 |
| Glycerine | 10 |
| Cyclohexyl amine carbonate solution | 20 |

This packing material, which is self-sealing can be used, for example as wrapping paper or for manufacture of bags or every type of wrapping. As a result of the bonding agent's low vapour penetrability with respect to the vapour of the inhibitor and owing to the fact that the wrapping can effectively be closed by means of the bonding agent an adequate erosion protection is obtained for the packed material.

It is also possible to add sodium benzoate in an aqueous solution and if desired sodium nitrite to the self-adhesive coating; these compounds also prevent corrosion of metals by contact action.

What is claimed is:

1. Moisture resistant cohesive coated paper wrapping material comprising a thin sheet of base material having on one side thereof a base layer of a first coating material consisting of a water insoluble vinyl polymer and a second layer of a second coating material consisting of a water insoluble vinyl polymer and a rubber latex selected from the group consisting of natural and synthetic rubber latices, said vinyl polymer and said rubber latex being present in the proportions of between equal parts of a 50% aqueous dispersion of vinyl polymer and 60% of natural rubber latex to 5% vinyl polymer and 95% natural rubber latex.

2. A wrapping material in accordance with claim 1, wherein said vinyl polymer in said first and second coating materials is selected from the group consisting of polyvinyl chloride, polyvinylidene chloride, polyvinyl chloride acetate, polyvinyl acetate and copolymers thereof.

3. A wrapping material in accordance with claim 1, wherein the ratio of rubber latex to vinyl polymer is so proportioned that the cohesive bond between two layers of said coating material exceeds the adhesive bond between said coating material and said base material.

4. A wrapping material in accordance with claim 1, wherein at least one of said layers comprises further a plasticizer selected from the group consisting of esters of adipates and phthalates.

5. A wrapping material in accordance with claim 1, comprising further a layer of a third coating material consisting of a casein-stabilized rubber latex wherein said latex is selected from the group consisting of natural and synthetic rubber latices.

6. A wrapping material in accordance with claim 1 for protecting a product against harmful organisms, wherein at least one of said layers has incorporated therein a substance which renders said organisms harmless.

7. A wrapping material in accordance with claim 1 for protecting a product against corrosion, wherein at least one of said layers of coating material has incorporated therein a corrosion-inhibiting substance.

8. A moisture resistant cohesive coated paper wrapping material comprising a base sheet of paper having on at least one side thereof a layer of a first coating material consisting of a dispersion of water insoluble polyvinylidene chloride, and a layer of a second coating material consisting of a mixture of approximately equal parts of a dispersion of water insoluble polyvinylidene chloride and a natural rubber latex.

9. A wrapping material in accordance with claim 8 comprising further a layer of a third coating material consisting of a dispersion of between 95 and 80 percent of a natural rubber latex and between 5 and 20 percent of polyvinylidene chloride.

References Cited in the file of this patent

UNITED STATES PATENTS

| | | |
|---|---|---|
| 2,291,838 | Shoan | Aug. 4, 1942 |
| 2,529,060 | Trillich | Nov. 7, 1950 |
| 2,704,732 | Copeman et al. | Mar. 22, 1955 |
| 2,709,689 | Herzog et al. | May 31, 1955 |
| 3,033,707 | Lacy et al. | May 8, 1962 |